United States Patent
Utsugi et al.

(10) Patent No.: US 10,094,672 B2
(45) Date of Patent: Oct. 9, 2018

(54) MAP INFORMATION UPDATE APPARATUS AND MAP INFORMATION UPDATE SYSTEM

(71) Applicant: HONDA MOTOR CO., LTD., Tokyo (JP)

(72) Inventors: Toshinori Utsugi, Haga-gun (JP); Takeshi Imai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 15/185,408

(22) Filed: Jun. 17, 2016

(65) Prior Publication Data

US 2016/0370191 A1  Dec. 22, 2016

(30) Foreign Application Priority Data

Jun. 22, 2015 (JP) ................. 2015-124574

(51) Int. Cl.
G01C 21/32 (2006.01)
H04L 29/08 (2006.01)
H04L 29/06 (2006.01)
G01S 19/14 (2010.01)

(52) U.S. Cl.
CPC .......... G01C 21/32 (2013.01); H04L 67/1097 (2013.01); H04L 67/12 (2013.01); H04L 69/22 (2013.01); G01S 19/14 (2013.01)

(58) Field of Classification Search
CPC ..... G01C 21/32; G01C 21/34; H04L 67/1097; H04L 67/12; H04L 69/22; G01S 19/14
USPC ....................................................... 701/451
See application file for complete search history.

(56) References Cited

U.S. PATENT DOCUMENTS

| 7,490,006 B2 * | 2/2009 | Sekine | G01C 21/32 701/451 |
| 7,711,473 B2 * | 5/2010 | Sekine | G01C 21/32 701/450 |
| 8,494,566 B2 * | 7/2013 | Chen | G01S 5/0252 370/338 |

(Continued)

FOREIGN PATENT DOCUMENTS

| JP | 2006-330279 A | 12/2006 |
| JP | 2009-008682 A | 1/2009 |
| JP | 2009-294479 A | 12/2009 |

*Primary Examiner* — Anne M Antonucci
*Assistant Examiner* — James E Stroud
(74) *Attorney, Agent, or Firm* — Squire Patton Boggs (US) LLP (57) ABSTRACT

A map information update apparatus includes: a map information storage unit that stores district map information including a plurality of division areas; a receiver that receives a broadcast wave carrying information of one or more of the plurality of division areas; a wireless communication unit that receives a radio wave carrying information of one or more of the plurality of division areas by wireless communication; and an information update unit that updates, when the district map information does not satisfy a first basis, the district map information for each division area based on the information carried by the broadcast wave received by the receiver and updates, when the district map information satisfies the first basis, the district map information for each division area based on the information carried by the radio wave received by the wireless communication unit.

8 Claims, 7 Drawing Sheets

(56) References Cited

U.S. PATENT DOCUMENTS

| | | | |
|---|---|---|---|
| 2004/0230373 A1* | 11/2004 | Tzamaloukas | G01C 21/28 |
| | | | 701/468 |
| 2006/0095202 A1* | 5/2006 | Atarashi | G01C 21/32 |
| | | | 701/451 |
| 2012/0036034 A1* | 2/2012 | Golden | H04W 4/02 |
| | | | 705/26.3 |
| 2013/0103200 A1* | 4/2013 | Tucker | G01C 21/206 |
| | | | 700/275 |
| 2014/0067195 A1* | 3/2014 | James | G06Q 50/30 |
| | | | 701/32.4 |
| 2014/0303892 A1* | 10/2014 | Morlock | G01C 21/20 |
| | | | 701/533 |
| 2017/0010613 A1* | 1/2017 | Fukumoto | G08G 1/096827 |
| 2017/0032311 A1* | 2/2017 | Rizzolo | G06Q 20/201 |
| 2017/0082728 A1* | 3/2017 | Hyatt | G01S 13/74 |
| 2017/0122762 A1* | 5/2017 | van der Molen | G01C 21/3602 |

\* cited by examiner

MAP INFORMATION UPDATE APPARATUS AND MAP INFORMATION UPDATE SYSTEM

CROSS-REFERENCE TO RELATED APPLICATION

Priority is claimed on Japanese Patent Application No. 2015-124574, filed on Jun. 22, 2015, the contents of which are incorporated herein by reference.

BACKGROUND

Field of the Invention

The present invention relates to a map information update apparatus and a map information update system.

Background

In the related art, map update systems are known in which, when map information stored in a storage unit of a mobile body is updated, radio waves that carry map information delivered from a broadcast station are received, and based on the map information carried by the received radio waves, map information is updated (for example, refer to Japanese Unexamined Patent Application, First Publication No. 2006-330279). Further, map update apparatuses are known in which map information is acquired using a mobile phone network and the like, and based on the acquired map information, map information stored in a storage unit of a mobile terminal is updated. Further, a technology disclosed in Japanese Unexamined Patent Application, First Publication No. 2009-008682 and a technology disclosed in Japanese Unexamined Patent Application, First Publication No. 2009-294479 are known.

SUMMARY

However, there may be a case in which since map information having a large volume cannot be carried by radio waves delivered from a broadcast station, map information cannot be smoothly updated. Further, there may be a case in which since communication charges arise when map information stored in a storage unit of a mobile terminal is updated based on map information acquired using a mobile phone network and the like, communication costs become a burden for a user.

An object of an aspect of the present invention is to provide a map information update apparatus and a map information update system capable of updating map information smoothly while reducing costs.

(1) An aspect of the present invention is a map information update apparatus that includes: a map information storage unit that stores district map information including a plurality of division areas; a receiver that receives a broadcast wave carrying information of one or more of the plurality of division areas; a wireless communication unit that receives a radio wave carrying information of one or more of the plurality of division areas by wireless communication; and an information update unit that updates, when the district map information does not satisfy a first basis, the district map information for each division area based on the information carried by the broadcast wave received by the receiver and updates, when the district map information satisfies the first basis, the district map information for each division area based on the information carried by the radio wave received by the wireless communication unit.

(2) In the aspect of the above (1), the wireless communication unit may include a first wireless communication unit that performs wireless communication using a mobile phone network and a second wireless communication unit that performs wireless communication directly with another terminal apparatus, and the information update unit may update, when the district map information satisfies the first basis and does not satisfy a second basis which is harder to achieve than the first basis, the district map information for each division area based on the information received by the first wireless communication unit and may update, when the district map information satisfies the second basis, the district map information for each division area based on the information received by the second wireless communication unit.

(3) In the aspect of the above (2), the first basis may be that a degree of the update of the district map information is equal to or more than a threshold value that is set to 0.4 to 0.7, and the second basis may be that a degree of the update of the district map information is equal to or more than a threshold value that is set to 0.7 to 0.9.

(4) In the aspect of any one of the above (1) to (3), edition identification information that indicates novelty may be imparted to each information of one or more of the plurality of division areas, and the information update unit may determine whether or not edition identification information of the information for a division area received by the receiver is matched to edition identification information of the information for the division area of the district map information stored in the map information storage unit and may determine whether or not the district map information is updated for each division area based on the determination result.

(5) Another aspect of the present invention is a map information update apparatus that includes: a map information storage unit that stores at least district map information including a plurality of division areas; a receiver that receives a broadcast wave carrying information of one or more of the plurality of division areas; a first wireless communication unit that receives a radio wave carrying information of one or more of the plurality of division areas by performing wireless communication using a mobile phone network; a second wireless communication unit that receives a radio wave carrying information of one or more of the plurality of division areas by performing wireless communication directly with another terminal apparatus; and an information update unit that updates the district map information for each division area based on the information received by the receiver, the first wireless communication unit, or the second wireless communication unit and that acquires information of one or more of the plurality of division areas using any of the receiver, the first wireless communication unit, and the second wireless communication unit in response to a rate of the update of the district map information and updates the district map information for each division area based on the acquired information.

(6) In the aspect of any one of the above (1) to (5), the map information update apparatus may be provided on a mobile body.

(7) In the aspect of any one of the above (1) to (5), the map information update apparatus may be provided on a portable terminal.

(8) Still another aspect of the present invention is a map information update system that includes: a map information update apparatus according to any one of the above (1) to (7); and a server apparatus that transmits information of one or more of the plurality of division areas.

According to the configuration of (1), (6), (7), or (8), the information update unit updates the district map information for each division area based on the information received by the receiver when the district map information does not satisfy a first basis. The information update unit updates the district map information for each division area based on the information received by the wireless communication unit when the district map information satisfies the first basis. Thereby, it is possible to update map information smoothly while reducing costs.

According to the configuration of (2) or (3), the information update unit updates the district map information for each division area based on the information received by the first wireless communication unit that performs wireless communication using a mobile phone network when the district map information satisfies the first basis and does not satisfy a second basis which is harder to achieve than the first basis. The information update unit updates the district map information for each division area based on the information received by the second wireless communication unit that performs wireless communication directly with another apparatus when the district map information satisfies the second basis. Thereby, it is possible to further reduce costs.

According to the configuration of (4), the information update unit determines whether or not edition identification information that indicates novelty of the information for a division area received by the receiver is matched to edition identification information of the information for the division area of the district map information stored in the map information storage unit. The information update unit determines whether or not the district map information is updated for each division area based on the determination result. Thereby, it is possible to update map information further accurately.

According to the configuration of (5), the information update unit acquires information of one or more of the plurality of division areas using any of the receiver, the first wireless communication unit, and the second wireless communication unit in response to a rate of the update of the district map information. The information update unit updates the district map information for each division area based on the acquired information. Therefore, it is possible to provide a map information update apparatus and a map information update system capable of updating map information smoothly while reducing costs.

DESCRIPTION OF THE EMBODIMENTS

Hereinafter, embodiments of a map information update apparatus and a map information update system of the invention will be described with reference to the drawings.

<First Embodiment>

Figure 1:
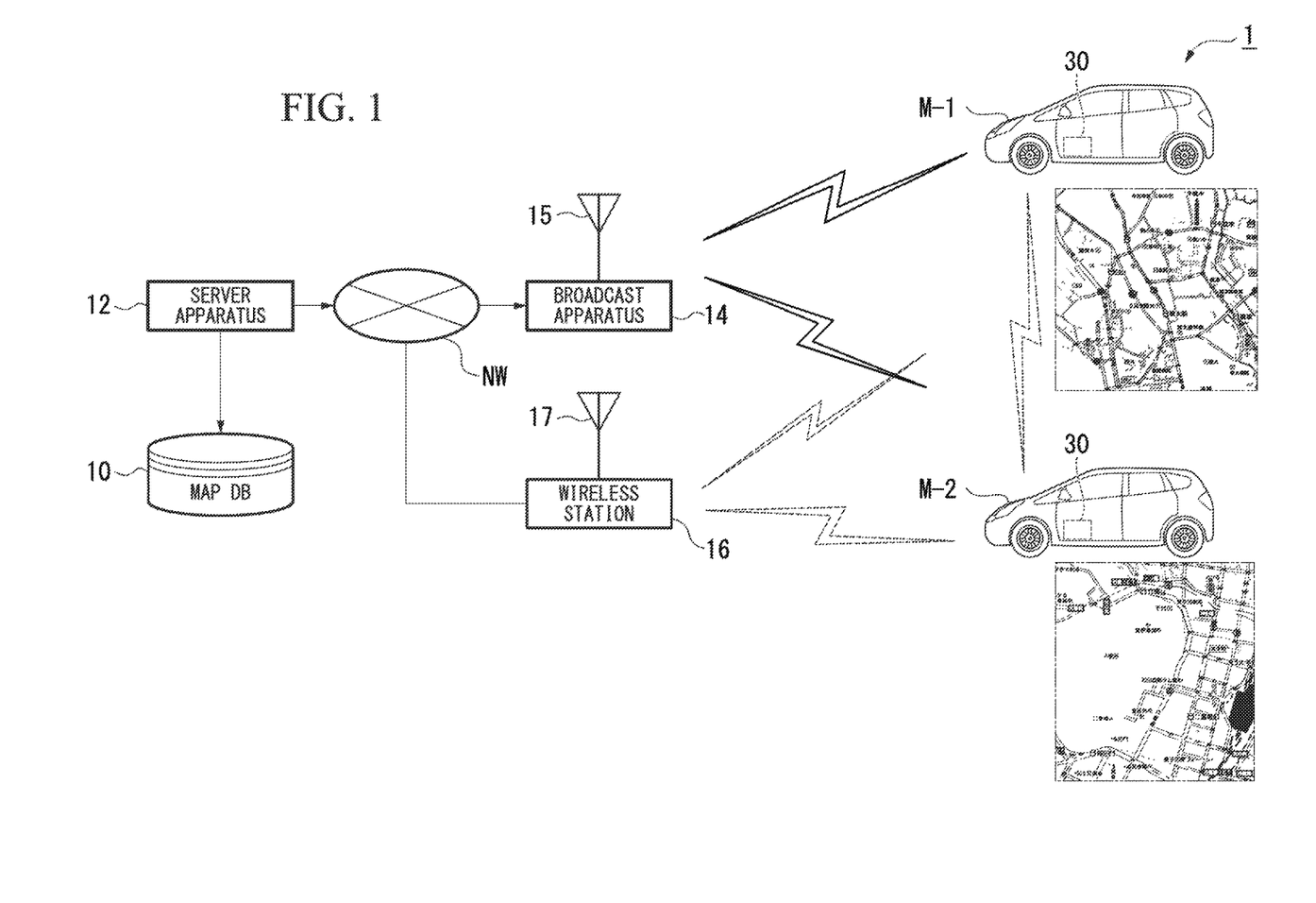
FIG. 1 is a schematic view showing a map information update system including a vehicle on which a map information update apparatus is provided according to an embodiment.

FIG. 1 is a schematic view showing a map information update system 1 including a vehicle on which a map information update apparatus 30 is provided according to an embodiment. The map information update system 1 includes: a map DB 10 as a map information database; a server apparatus 12, a broadcast apparatus 14; a wireless station 16; and map information update apparatuses 30 provided on a vehicle M-1 and a vehicle M-2. The server apparatus 12, the broadcast apparatus 14, and the wireless station 16 perform communication with one another via a network NW. The network NW includes, for example, a wide area network (WAN), a local area network (LAN), a public line, a virtual private network (VPN), and the like. Hereinafter, the vehicle M-1 is referred to as a vehicle or a first vehicle, and the vehicle M-2 is referred to as another vehicle or a second vehicle. Further, when the first vehicle M-1 is not distinguished from the second vehicle M-2, each of the first vehicle M-1 and the second vehicle is referred to as a vehicle M. Note that, the map information update system 1 may include map information update apparatuses 30 provided respectively on three or more vehicles.

The map DB 10 is stored in a storage device such as a hard disk drive (HDD) or a solid state drive (SSD) that is accessible by the server apparatus 12. The storage device may be a network attached storage (NAS) device connected to the network NW or may be a device provided on the server apparatus 12. The map DB 10 stores map information. The map information in the map DB 10 is updated to the newest one as needed.

The server apparatus 12 transmits, to the broadcast apparatus 14 or the wireless station 16, map information stored in the map DB 10 in response to a request of the broadcast apparatus 14 or the wireless station 16. Further, the server apparatus 12 transmits, to the broadcast apparatus 14 and the wireless station 16, road information such as traffic jam information acquired via the map DB 10 or the network NW.

Figure 2:
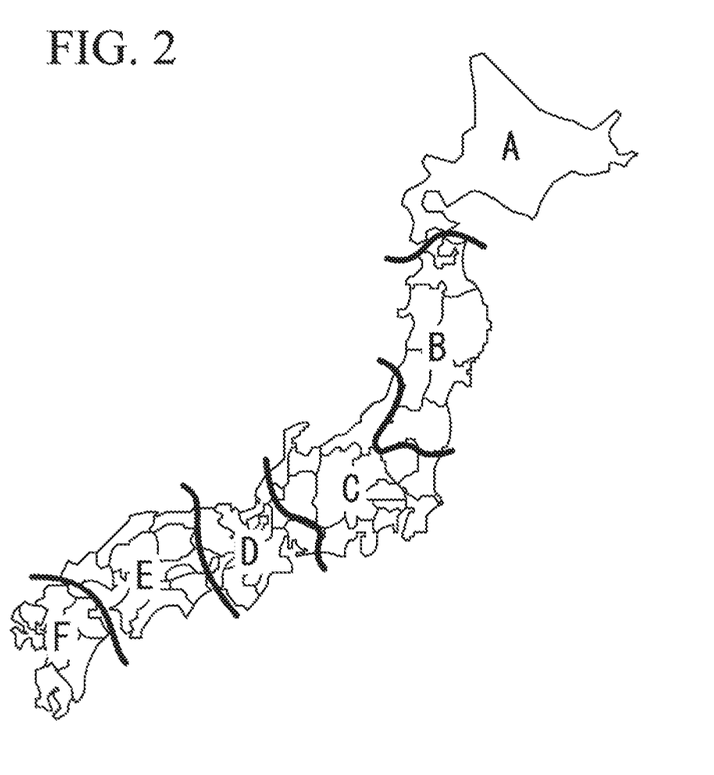
FIG. 2 is a view showing an example of six districts.

The broadcast apparatus 14 generates broadcast waves carrying the map information or the road information acquired from the server apparatus 12 using an antenna 15 and broadcasts the generated broadcast waves. Here, for example, a frequency band of 90 [MHz] to 108 [MHz] is used for the broadcast waves used to broadcast the map information or the road information by the broadcast apparatus 14. Note that, a broadcast apparatus having a function similar to the broadcast apparatus 14 is provided corresponding to each district, for example, such as Kanto district or Tohoku district. The broadcast apparatus provided at each district broadcasts, for example, map information (district map information) of a corresponding district. The present embodiment is described using an example in which the broadcast apparatus 14 is provided at each of six divided districts and broadcasts map information of each district. FIG. 2 is a view showing an example of six divided districts. For example, there are six divided blocks of districts A to F. In this case, each of the broadcast apparatuses 14 provided at the districts A to F broadcasts map information of the district at which the broadcast apparatus 14 is provided.

The wireless station 16 transmits radio waves carrying the map information or the road information acquired from the server apparatus 12 to the vehicle M using an antenna 17 in response to a request from the vehicle M. The wireless station 16 is, for example, a base station that configures a mobile phone network or a Wi-Fi access point.

The map information update apparatus 30 provided on the vehicle M acquires the map information delivered from the broadcast apparatus 14, the map information transmitted from the wireless station 16, and map information transmitted from another vehicle.

Note that, "division area information" which is information capable of distinguishing between division areas of map information is included in the map information delivered from the broadcast apparatus 14, the map information transmitted from the wireless station 16, and the map information transmitted from another vehicle.

Figure 3:
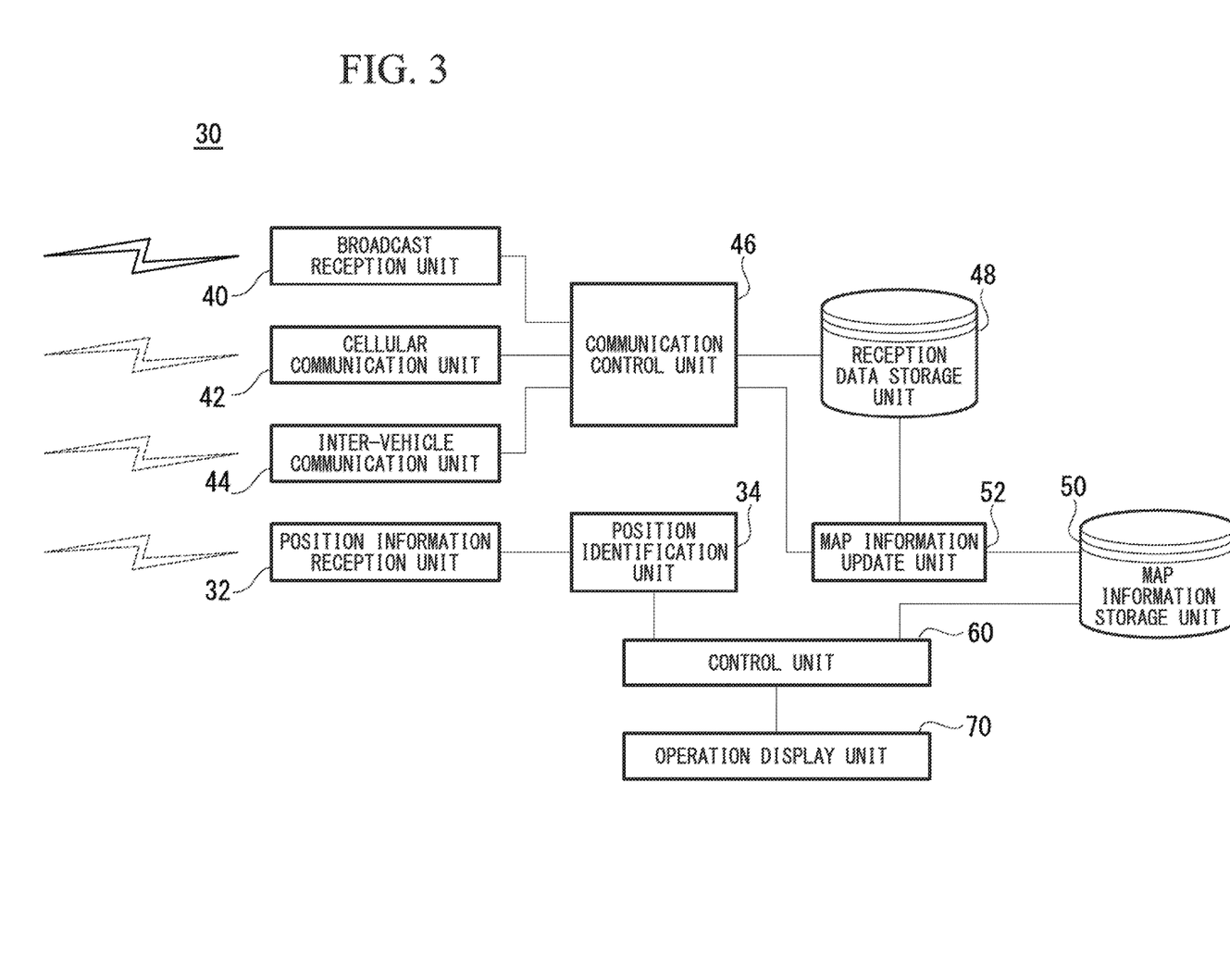
FIG. 3 is a functional configuration view of the map information update apparatus.

FIG. 3 is a functional configuration view of the map information update apparatus 30. The map information update apparatus 30 includes a position information reception unit 32, a position identification unit 34, a broadcast reception unit 40, a cellular communication unit 42, an inter-vehicle communication unit 44, and a communication control unit 46. Further, the map information update apparatus 30 includes a reception data storage unit 48, a map information storage unit 50, a map information update unit 52, a control unit 60, and an operation display unit 70.

The map information update unit 52 and the control unit 60 are, for example, software functional units that function by executing a program stored in a program memory by a processor such as a central processing unit (CPU) provided at the map information update apparatus 30. Further, the map information update unit 52 and the control unit 60 may be hardware functional units such as a large scale integration (LSI) or an application specific integrated circuit (ASIC). The reception data storage unit 48 is realized, for example, by a random access memory (RAM). Further, the map information storage unit 50 is realized, for example, by a readable and writable non-volatile storage device such as a hard disk drive (HDD), a flash memory, or an electrically erasable programmable read-only memory (EEPROM).

The position information reception unit 32 receives radio waves from a plurality of satellites such as a plurality of global positioning system (GPS) satellites. The position identification unit 34 identifies the position of the vehicle by performing positioning calculation based on the radio waves received by the position information reception unit 32. Further, the position identification unit 34 may identify the position of the vehicle M by combining the radio waves received by the position information reception unit 32 and another method. Examples of another method include a method in which the vehicle position change is derived based on the detection result of an acceleration sensor (not shown), a gyro sensor (not shown), or the like provided on the vehicle M.

The broadcast reception unit 40 receives broadcast waves broadcasted from the antenna 15 of the broadcast apparatus 14. The broadcast reception unit 40 can receive the broadcast waves carrying map information from the broadcast apparatus 14, for example, at no charge. The cellular communication unit 42 receives radio waves carrying map information transmitted from the antenna 17 of the wireless station 16. The cellular communication unit 42 includes, for example, a communication module for connecting to a mobile phone network and the like. The communication between the cellular communication unit 42 and the wireless station 16 is, for example, charged. The inter-vehicle communication unit 44 communicates with an inter-vehicle communication unit of another vehicle (second vehicle) using wireless communication. The inter-vehicle communication unit 44 communicates with the inter-vehicle communication unit of the second vehicle, for example, using a Wi-Fi technique. The inter-vehicle communication unit 44 receives radio waves carrying map information or road information transmitted from the second vehicle.

The communication control unit 46 extracts information from the broadcast waves received by the broadcast reception unit 40 and stores map information included in the extracted information in the reception data storage unit 48. Further, the communication control unit 46 extracts information from the radio waves received by the cellular communication unit 42 or the inter-vehicle communication unit 44 and stores map information included in the extracted information in the reception data storage unit 48. The reception data storage unit 48 temporarily stores the map information stored by the communication control unit 46.

Figure 4:
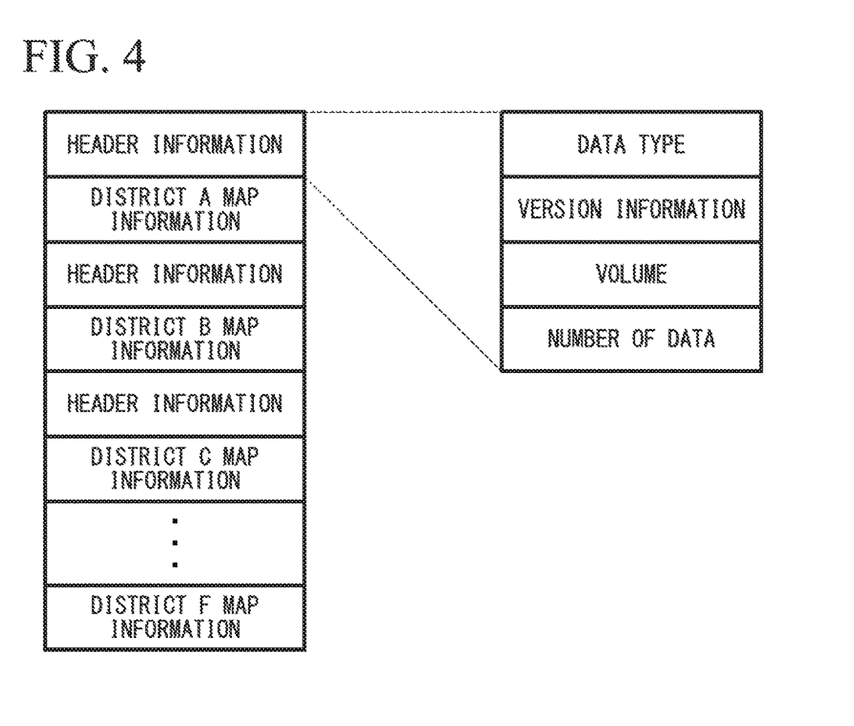
FIG. 4 is a view showing an example of map information.

The map information storage unit 50 stores map information of one or more of a plurality of districts. The plurality of districts correspond to, for example, the districts A to F described above (refer to FIG. 2). FIG. 4 is a view showing an example of map information. The map information of the districts A to F are imparted by header information that defines a configuration of map information for each district. The header information includes a data type indicating the type of map information, version information (edition identification information) of map information, the volume of map information, and the number of map information of a district (the number of division areas described below).

Figure 5:
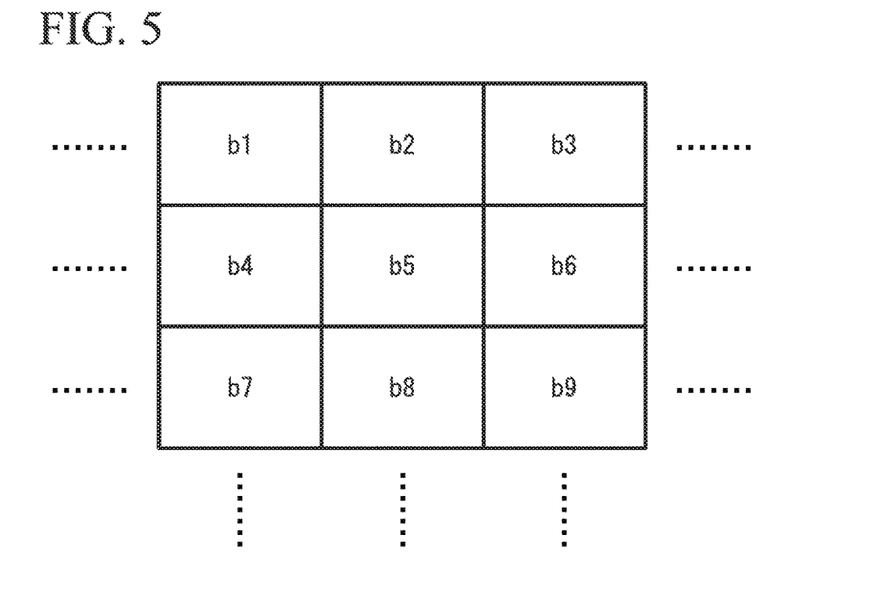
FIG. 5 is an enlarged view of part of a district B.
Figure 6:
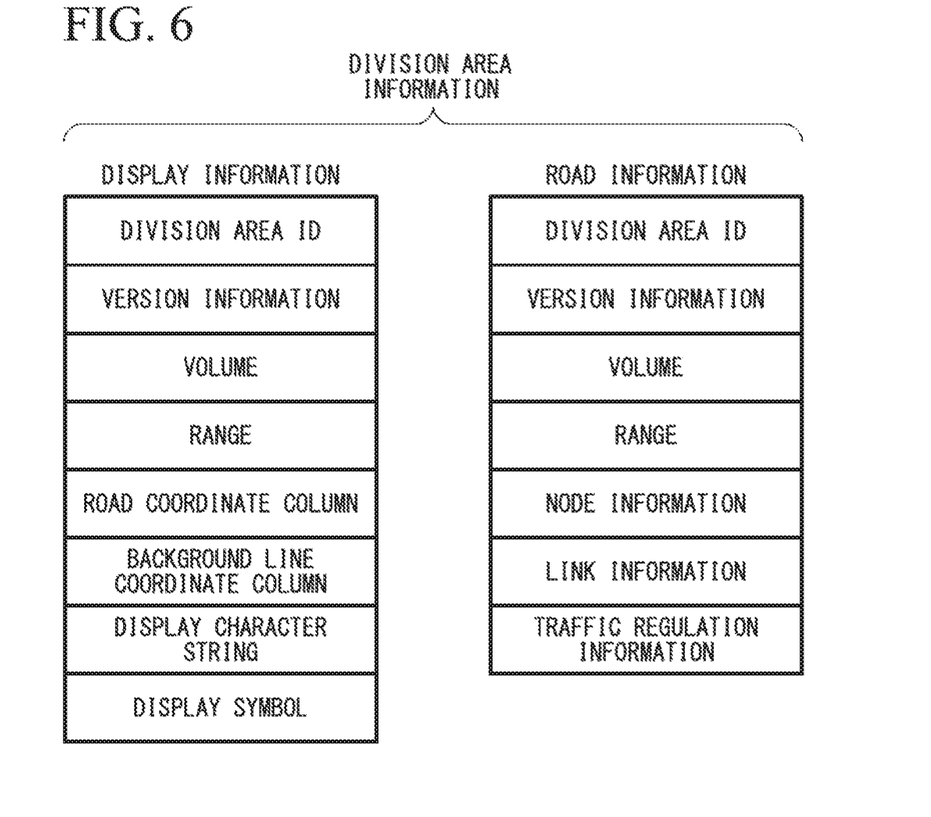
FIG. 6 is a view showing an example of division area information.

FIG. 5 is an enlarged view of part of the district B. In the example of FIG. 5, a region of the district B is divided into a plurality of division areas (b1 to b9). Further, the map information of each district is imparted by division area information for each division area. FIG. 6 is a view showing an example of division area information. The division area information includes, for example, display information and road information. In the display information, a division area ID is associated with version information (edition identification information), an information volume, an information range, a road coordinate column, a background line coordinate column, a display character string, and a display symbol. Note that, the range of information is the range of a division area. The road coordinate column, the background line coordinate column, the display character string, and the display symbol are information used to identify a display target object such as a building and cause the operation display unit 70 to display the display target object. In the road information, a division area ID is associated with version information (edition identification information), an information volume, an information range, node information, link information, and traffic regulation information. The node information is information indicating an intersection and the like, and the link information is information indicating a road between intersections. Further, the traffic regulation information is information indicating a traffic regulation such as no entry.

The map information update unit 52 compares map information stored in the reception data storage unit 48 with map information stored in the map information storage unit 50 and updates the map information stored in the map information storage unit 50 based on the comparison result. The detail of the process of the map information update unit 52 is described later.

Based on position information of a vehicle identified by the position identification unit 34, input information input through an operation of the operation display unit 70 by a user, and map information stored in the map information storage unit 50, the control unit 60 derives information corresponding to the input information and causes the operation display unit 70 to display the derived result. The control unit 60 functions as part of a navigation system that derives, for example, a route, a required time, or the like to a destination corresponding to input information and presents the derived result to the user by an image or speech.

The operation display unit 70 is configured by a liquid crystal display (LCD) or an organic electroluminescence (EL) display device overlapped by an input unit that is capable of detecting a touch position of an operator by a coordinate detection mechanism. The operation display unit 70 outputs a signal indicating a position (coordinate) of a touch operation of a user to the control unit 60. The operation display unit 70 displays a route, a required time, or the like to a destination based on a command of the control unit 60.

Figure 7:
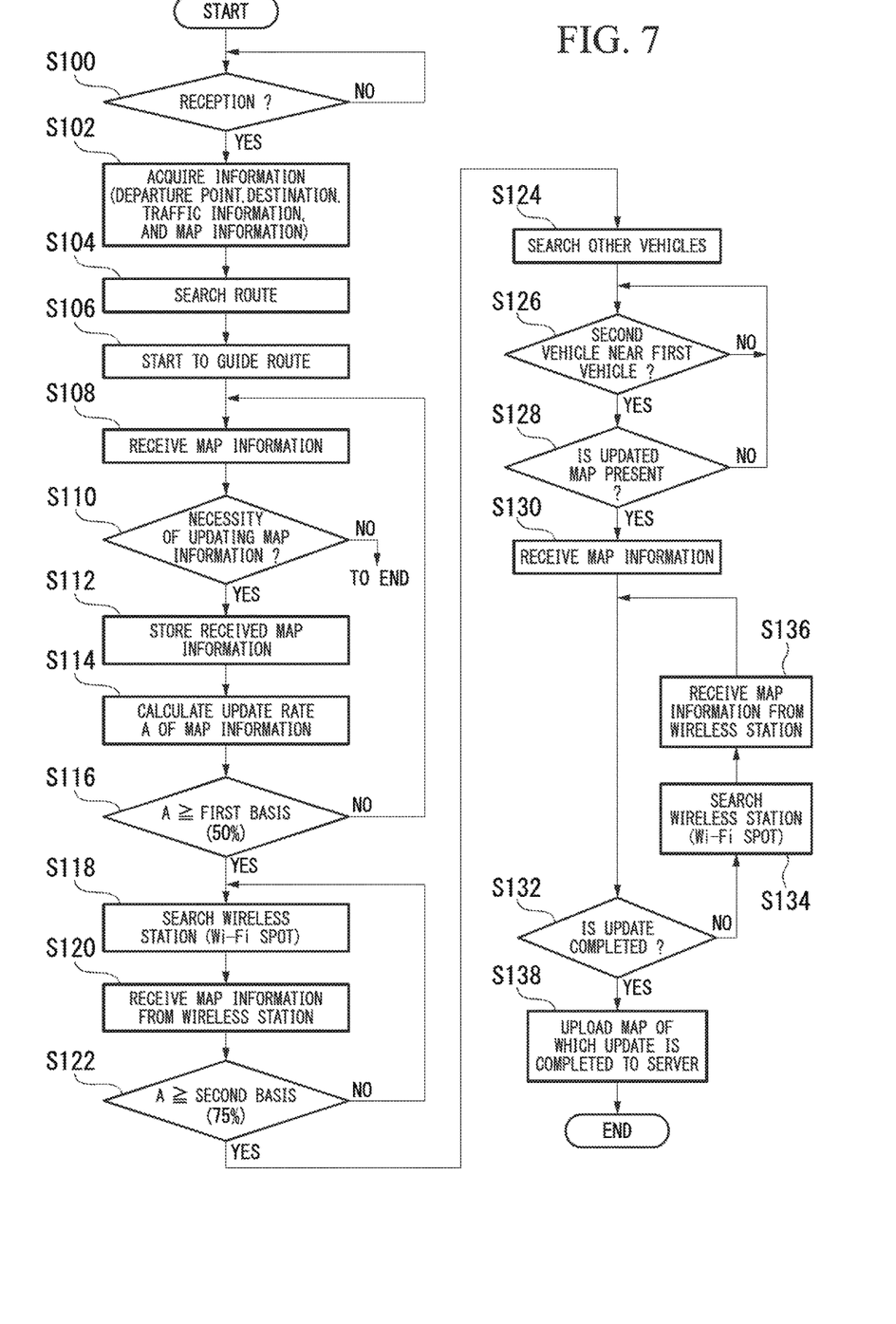
FIG. 7 is a flowchart showing a process flow performed by the map information update apparatus.

FIG. 7 is a flowchart showing a process flow performed by the map information update apparatus 30. First, the control unit 60 waits until an input operation by a user to the operation display unit 70 is performed (step S100). When an input operation by a user to the operation display unit 70 is performed, the control unit 60 acquires a current position, a destination, road information, map information, and the like (step S102). The control unit 60 derives (searches) an optimum route from a departure point to a destination based on the information acquired in step S102 (step S104) and starts to guide the vehicle in accordance with the derived route (step S106). The control unit 60 performs a map matching process based on the derived route, the map information stored in the map DB 10, and the position of the vehicle identified by the position identification unit 34 and guides the vehicle by displaying a route to the destination on the operation display unit 70.

Next, the map information update unit 52 causes the broadcast reception unit 40 to receive the district map information delivered from the broadcast apparatus 14 (step S108). The district map information in step S108 is map information of a district at which the vehicle is currently positioned. Further, in the present embodiment, the broadcast apparatus 14 delivers division area information such that the division area of the district at which the vehicle is currently positioned is one unit and, after the division area information of one unit is transmitted, sequentially delivers the division area information of the next one unit.

Next, the map information update unit 52 compares district map information acquired in step S108 with district map information stored in the map information storage unit 50 and determines the necessity of updating map information based on the comparison result (step S110). The method of determining the necessity of updating map information is described later. When it is unnecessary to update map information, the process of the present flowchart is finished.

When it is necessary to update map information, the map information update unit 52 stores the received map information in the map information storage unit 50 (step S112). Thereby, the map information stored in the map information storage unit 50 is sequentially updated to the newest map information for each division area. Next, the map information update unit 52 calculates an update rate A of the updated map information (step S114). The map information update unit 52 calculates the update rate A of the map information by dividing the map information after updating by the map information before updating. Next, the map information update unit 52 determines whether or not the update rate A of the map information is equal to or more than a first basis (for example, 50 percent [%]) (step S116). When the update rate A of the map information is less than the first basis, the routine returns to the process of step S108.

When the update rate A of the map information is equal to or more than the first basis, the map information update unit 52 controls the communication control unit 46 to search a wireless station 16 (for example, a Wi-Fi access point) for establishing a communication link with the cellular communication unit 42 (step S118). Next, the map information update unit 52 establishes a communication link with the wireless station 16 searched in step S118 by the cellular communication unit 42 and receives radio waves carrying map information sent from the wireless station 16 (step S120). At this time, the map information update unit 52 stores the received map information in the map information storage unit 50 to update map information (refer to step S112) and calculates the update rate A of the updated map information (refer to step S114).

Next, the map information update unit 52 determines whether or not the update rate A of the map information is equal to or more than a second basis (for example, 75 percent [%]) (step S122). When the update rate A of the map information is less than the second basis, the routine returns to the process of step S118.

When the update rate A of the map information is equal to or more than the second basis, the map information update unit 52 controls the communication control unit 46 to search an inter-vehicle communication unit of other vehicles for establishing a communication link with the inter-vehicle communication unit 44 (step S124). Next, the map information update unit 52 determines whether or not another vehicle in the vicinity of the first vehicle is present of other vehicles searched in step S124 (that is, a plurality of vehicles other than the first vehicle) (step S126). Examples of another vehicle in the vicinity of the first vehicle include a vehicle that is positioned in the range of several kilometers [km] from the first vehicle, another vehicle that is positioned in the range of several kilometers [km] from the first vehicle and is present in the destination direction from the first vehicle, and the like. When another vehicle in the vicinity of the first vehicle is not present, another vehicle in the vicinity of the first vehicle is continuously searched.

When another vehicle (second vehicle) in the vicinity of the first vehicle is present, the map information update unit 52 determines whether or not another vehicle (the second vehicle) searched in step S126 stores the newest map (step S128). The map information update unit 52 determines whether or not another vehicle (the second vehicle) searched in step S126 stores the newest map, for example, based on information acquired from the cellular communication unit 42. The server apparatus 12 acquires map information stored by the first vehicle and the second vehicle via the wireless station 16 and determines whether or not the map information stored by the second vehicle is the newest map information compared to the map information stored by the first vehicle. The server apparatus 12 sends, to the first vehicle, a determination result of whether or not the map information stored by the second vehicle is the newest map information compared to the map information stored by the first vehicle.

The map information update unit 52 acquires the determination result from the server apparatus 12 and determines whether or not another vehicle (the second vehicle) searched in step S126 stores the newest map based on the acquired information.

Further, the map information update unit 52 of the first vehicle may acquire version information included in header information of map information from the second vehicle via the inter-vehicle communication unit 44 and may determine whether or not the acquired version information is the newest map information. In this case, a correspondence table that indicates novelty of the version information sent from the server apparatus 12 is stored in the map information storage unit 50.

When another vehicle (the second vehicle) searched in step S126 does not store the newest map, the routine returns to the process of step S126, and other vehicles are searched. When another vehicle (the second vehicle) searched in step S126 stores the newest map, the map information update unit 52 receives map information from another vehicle (the second vehicle) searched in step S126 (step S130). At this time, the map information update unit 52 stores the received map information in the map information storage unit 50 to update map information (refer to step S112) and calculates the update rate A of the updated map information (refer to step S114).

Next, the map information update unit 52 determines whether or not the update of the map information stored in the map information storage unit 50 is completed (step S132). The determination of whether or not the update of the map information is completed is a determination of whether or not all division area information of map information of a district stored in the map information storage unit 50 is updated to the newest information.

When the update of the map information stored in the map information storage unit 50 is not completed, the map information update unit 52 controls the communication control unit 46 to search a wireless station 16 (for example, a Wi-Fi access point) for establishing a communication link with the cellular communication unit 42 (step S134). Next, the map information update unit 52 establishes a communication link with the wireless station 16 searched in step S134 by the cellular communication unit 42 and receives radio waves carrying map information sent from the wireless station 16 (step S136). When the update of the map information stored in the map information storage unit 50 is completed, the map information update unit 52 uploads the map information of which the update is completed to the server apparatus 12 (step S138). By uploading the map information of which the update is completed to the server apparatus 12, it is possible to cause the server apparatus 12 to perform information collection using the vehicle as a probe, and it is possible to contribute to updating the map DB 10. Thereby, the process of the present flowchart is finished.

Here, the method of determining the necessity of updating map information in step S110 is described. The map information update unit 52 extracts from the map information storage unit 50 a division area ID that matches to a division area ID of the division area information of one unit delivered from the broadcast apparatus 14. The map information update unit 52 determines whether or not version information of the extracted division area information is matched to version information of the division area information delivered from the broadcast apparatus 14. When the version information of the extracted division area information is matched to the version information of the division area information delivered from the broadcast apparatus 14, the map information update unit 52 determines that it is unnecessary to update district map information. When the version information of the extracted division area information is not matched to the version information of the division area information delivered from the broadcast apparatus 14, the map information update unit 52 determines that it is necessary to update district map information.

Further, another method of determining the necessity of updating map information in step S110 is described. The map information update unit 52 transmits header information that defines a configuration of entire district map information stored in the map information storage unit 50 to the server apparatus 12 by using the cellular communication unit 42. The server apparatus 12 acquires header information transmitted from the cellular communication unit 42 and determines whether or not version information included in the acquired header information is version information corresponding to the newest map information. The server apparatus 12 transmits to the map information update apparatus 30 the determination result indicating whether or not the version information included in the acquired header information is version information corresponding to the newest map information. When the determination result is version information corresponding to the newest map information, the map information update unit 52 of the map information update apparatus 30 determines that it is unnecessary to update district map information. When the determination result is not version information corresponding to the newest map information, the map information update unit 52 of the map information update apparatus 30 determines that it is necessary to update district map information. Note that, in this case, the map information update unit 52 may perform the process of step S110 before the process of step S108.

Further, the map information update apparatus 30 may acquire schedule information that indicates a delivery schedule of map information periodically delivered by the broadcast apparatus 14 from the server apparatus 12 and may determine the necessity of updating map information based on the acquired schedule information. In this case, the map information update unit 52 of the map information update apparatus 30 determines whether or not the map information storage unit 50 stores map information or division area information having version information that is matched to version information of header information or version information of division area information included in the schedule information. When the map information storage unit 50 does not store map information or division area information having version information that is matched to the version information included in the schedule information, the map information update unit 52 determines that it is necessary to update district map information.

Note that, the first basis may be set to be smaller than the second basis. Thereby, it is possible to reduce the communication volume between the wireless station 16 and the map information update apparatus 30. As a result, it is possible to reduce communication costs charged to a user using the map information update apparatus 30. Further, the first basis and the second basis may be set based on information volume per unit time which can be delivered by the broadcast apparatus 14 and information volume of map information as a target of update. For example, the first basis may be set to, for example, a value of 50 percent [%] to 70 percent [%]. Further, the second basis may be set to, for example, a value of 70 percent [%] to 90 percent [%]. Thereby, it is possible to update map information smoothly, for example, such that communication costs charged to a user do not exceed a predetermined upper limit.

Further, in step S110 of FIG. 7, when it is unnecessary to update map information, the map information update unit 52 may determine whether or not a modification part that partially requires modification (change of a town name and the like) is present. When a partial modification part is present, the map information update unit 52 may cause the cellular communication unit 42 to perform communication using Wi-Fi and may perform modification of the modification part.

The map information update apparatus 30 of the first embodiment described above can update map information smoothly while reducing costs as the map information update unit 52 acquires map information transmitted from another apparatus using any of the broadcast reception unit 40, the cellular communication unit 42, and the inter-vehicle communication unit 44 in response to a rate of update of district map information and updates the district map information for each of division areas based on the acquired map information.

<Second Embodiment>

Hereinafter, a map information update apparatus 30 according to a second embodiment is described with reference to the drawings. In addition to performing a process similar to the first embodiment, the map information update apparatus 30 of the second embodiment further includes a function of updating map information with reference to a route derived by the control unit 60. In the following description, the above difference is mainly described.

Figure 8:
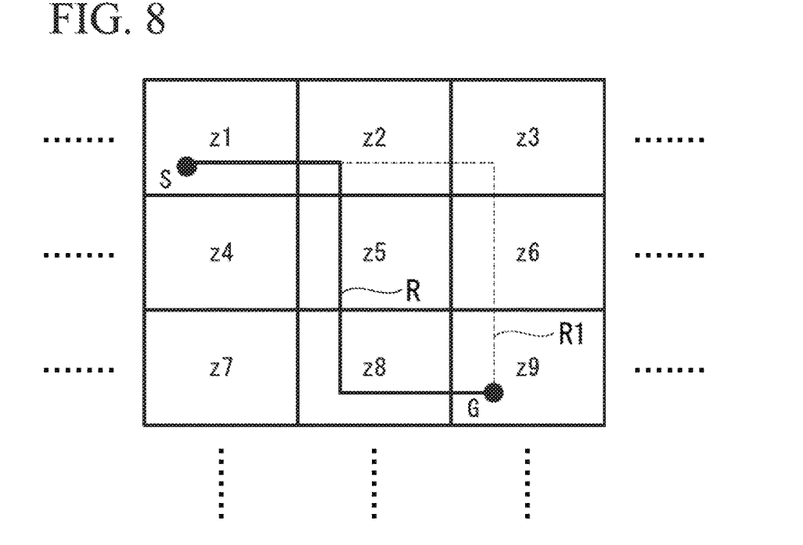
FIG. 8 is a view showing an example of a route from a departure point to a destination derived by a control unit.

FIG. 8 is a view showing an example of a route from a departure point to a destination derived by the control unit 60. In the example of FIG. 8, it is assumed that the control unit 60 derives a route R and a route R1 from a departure point S to a destination and the route R is selected as an optimum route. The route R is a route that passes division areas z2, z5, and z8 of division areas z1 to z9 from the departure point S of the division area z1 to the destination G of the division area z9. Further, the route R1 is a route that passes division areas z2, z3, and z6 of the division areas z1 to z9 from the departure point S of the division area z1 to the destination G of the division area z9.

Figure 9:
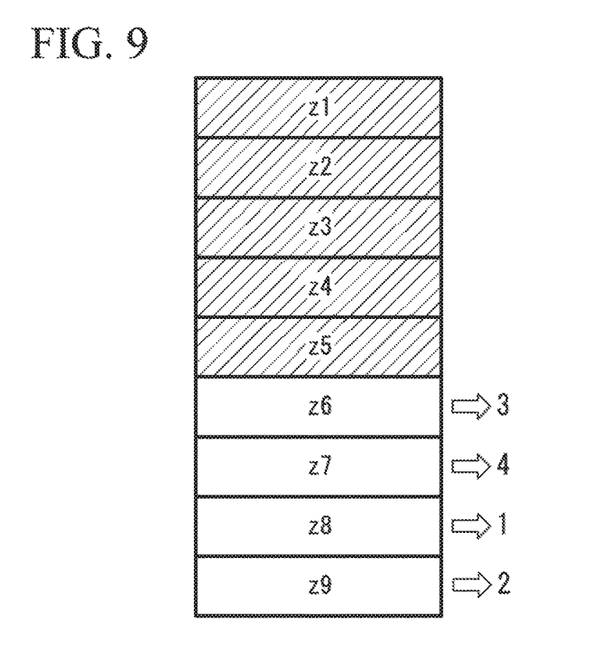
FIG. 9 is a schematic view showing map information stored in a map information storage unit.

FIG. 9 is a schematic view showing map information stored in the map information storage unit 50. The map information shown in FIG. 9 indicates division area information z1 to z9. The division area information z1 to z5 of the division area information z1 to z9 are division area information updated based on the division area information received by the broadcast reception unit 40.

It is assumed that the division area information z1 to z5 are updated and thereby the first basis is satisfied.

At this time, the map information update unit 52 calculates priority with respect to the division area information z6 to z9 that are not updated and imparts the calculated priority to the division area information z6 to z9.

The map information update unit 52 calculates priority such that higher priority is given to a division area that is close to the first vehicle and includes an optimum route of the division area information which are not updated. Next, the map information update unit 52 calculates priority such that next higher priority is given to a division area that is close to the first vehicle and that includes a route which is derived by the control unit 60 and is not selected as the optimum route. In the example of FIG. 9, the map information update unit 52 gives higher priority in the order of division area information z8, z9 of the division area close to the first vehicle of the division area z8 and z9 including the route R. Further, the map information update unit 52 gives higher priority to the division area information z6 of a division area that includes a route R1 which is derived by the control unit 60 and is not selected as the optimum route, next to the division area information z8 and z9. In the example of FIG. 9, the smaller number indicates higher priority.

The map information update unit 52 associates information indicating priority with the division area information that are not updated, transmits the associated information to the server apparatus 12, and requests to transmit division area information in accordance with the priority. The server apparatus 12 transmits division area information in the order of priority to the map information update apparatus 30 in response to the request transmitted by the map information update unit 52. Note that, the process of the second embodiment is performed between step S118 and step S120 of FIG. 7.

In the map information update apparatus 30 of the second embodiment described above, the map information update unit 52 refers to the route derived by the control unit 60 and calculates priority of the division area information received from the server apparatus 12. Further, the map information update unit 52 acquires the division area information transmitted from the server apparatus 12 in accordance with the calculated priority, and thereby, it is possible to promptly update map information with respect to a required division area.

Note that, the first embodiment and the second embodiment are described using an example in which the map information update apparatus 30 is provided on a mobile body such as a vehicle; however, the map information update apparatus 30 may be provided on a portable terminal. Further, the portable terminal on which the map information update apparatus 30 is provided is caused to function in a vehicle, and thereby, it is possible to realize a function similar to the map information update apparatus 30 provided on a mobile body such as a vehicle.

Further, the first embodiment and the second embodiment are described using an example in which the update of the map is performed using radio waves, a Wi-Fi spot, and inter-vehicle communication; however, it is possible to substitute a portable memory (portable storage device) such as a USB memory and the like for any of these methods.

Although embodiments of the present invention have been described, the present invention is not limited thereto, and various changes and substitutions can be made without departing from the scope of the invention.

The invention claimed is:

1. A map information update apparatus comprising:
   a map information storage unit that stores map information of a district including a plurality of division areas;
   a receiver that receives a broadcast wave carrying information of one or more of the plurality of division areas;
   a wireless communication unit that receives a radio wave carrying information of one or more of the plurality of division areas by wireless communication; and
   an information update unit that sequentially updates, when the map information of the district does not satisfy a first criterion, map information for each division area in the district based on the information carried by the broadcast wave received by the receiver and sequentially updates, when the map information of the district satisfies the first criterion, the map information for each division area in the district based on the information carried by the radio wave received by the wireless communication unit,
   wherein the first criterion is that a degree of the update calculated by dividing an amount of updated map information of the district when sequentially updating the map information for each division area in the district by an amount of map information of the district before sequentially updating the map information for each division area in the district is equal to or more than a value that is set in a range from 0.4 to 0.7.

2. The map information update apparatus according to claim 1, wherein
   the wireless communication unit includes a first wireless communication unit that performs wireless communication using a mobile phone network and a second wireless communication unit that performs wireless communication directly with another terminal apparatus, and the information update unit updates, when the map information of the district satisfies the first criterion and does not satisfy a second criterion which is harder to achieve than the first criterion, the map information for each division area in the district based on the information received by the first wireless communication unit and updates, when the map information of the district satisfies the second criterion, the map information for each division area in the district based on the information received by the second wireless communication unit.

3. The map information update apparatus according to claim 2, wherein the second criterion is that the degree of the update is equal to or more than a value that is set in a range from 0.7 to 0.9.

4. The map information update apparatus according to claim 1, wherein edition identification information that indicates novelty is imparted to each information of one or more of the plurality of division areas, and the information update unit determines whether or not edition identification information of the information for each division area received by the receiver matches edition identification information of the map information for a corresponding division area in the map information of the district stored in the map information storage unit and determines whether or not the map information of the district is to be updated for each division area based on the determination result.

5. The map information update apparatus according to claim 1, wherein the map information update apparatus is provided on a mobile body.

6. The map information update apparatus according to claim 1, wherein the map information update apparatus is provided on a portable terminal.

7. A map information update apparatus comprising:

a map information storage unit that stores at least map information of the district including a plurality of division areas;

a receiver that receives a broadcast wave carrying information of one or more of the plurality of division areas;

a first wireless communication unit that receives a radio wave carrying information of one or more of the plurality of division areas by performing wireless communication using a mobile phone network;

a second wireless communication unit that receives a radio wave carrying information of one or more of the plurality of division areas by performing wireless communication directly with another terminal apparatus; and an information update unit that sequentially updates the map information for each division area in the district based on the information received by the receiver, the first wireless communication unit, or the second wireless communication unit and that acquires information of one or more of the plurality of division areas using any of the receiver, the first wireless communication unit, and the second wireless communication unit and sequentially updates the map information for each division area in the district based on the acquired information, wherein:

when the map information of the district does not satisfy a first criterion, the information update unit sequentially updates the map information for each division area in the district based on the information carried by the broadcast wave received by the receiver;

when the map information of the district satisfies the first criterion, the information update unit sequentially updates the map information for each division area in the district based on the information carried by the radio wave received by the first wireless communication unit or the information carried by the radio wave received by the second wireless communication unit; and the first criterion is that a degree of the update calculated by dividing an amount of updated map information of the district when sequentially updating the map information for each division area in the district by an amount of map information of the district before sequentially updating the map information for each division area in the district is equal to or more than a value that is set in a range from 0.4 to 0.7.

8. A map information update system comprising:

a map information update apparatus; and a server apparatus that transmits information of one or more of a plurality of division areas in a district, the map information update apparatus comprising:

a map information storage unit that stores map information of the district including the plurality of division areas;

a receiver that receives, from the server apparatus, a broadcast wave carrying information of one or more of the plurality of division areas;

a wireless communication unit that receives, from the server apparatus, a radio wave carrying information of one or more of the plurality of division areas by wireless communication; and an information update unit that sequentially updates, when the map information of the district does not satisfy a first criterion, map information for each division area in the district based on the information carried by the broadcast wave received by the receiver and sequentially updates, when the map information of the district satisfies the first criterion, the map information for each division area in the district based on the information carried by the radio wave received by the wireless communication unit, wherein the first criterion is that a degree of the update calculated by dividing an amount of updated map information of the district when sequentially updating the map information for each division area in the district by an amount of map information of the district before sequentially updating the map information for each division area in the district is equal to or more than a value that is set in a range from 0.4 to 0.7.

* * * * *